(12) United States Patent
Kim et al.

(10) Patent No.: US 11,601,341 B2
(45) Date of Patent: Mar. 7, 2023

(54) METHOD FOR MANAGING SYSTEM AND APPARATUS THEREFOR

(71) Applicant: Coupang Corp., Seoul (KR)

(72) Inventors: Young Jin Kim, Seoul (KR); Jin Su Lee, Seoul (KR); Su Ji Woo, Seoul (KR); Suk Min Ahn, Seoul (KR); Jae Ho Jeong, Seoul (KR)

(73) Assignee: Coupang Corp.

( * ) Notice: Subject to any disclaimer, the term of this patent is extended or adjusted under 35 U.S.C. 154(b) by 37 days.

(21) Appl. No.: 17/322,722

(22) Filed: May 17, 2021

(65) Prior Publication Data

US 2021/0320849 A1 Oct. 14, 2021

Related U.S. Application Data

(63) Continuation of application No. 16/990,922, filed on Aug. 11, 2020, now Pat. No. 11,038,772.

(30) Foreign Application Priority Data

Apr. 8, 2020 (KR) ........................ 10-2020-0042735

(51) Int. Cl.
*H04L 41/22* (2022.01)
*G06F 21/62* (2013.01)
(Continued)

(52) U.S. Cl.
CPC .......... *H04L 41/22* (2013.01); *G06F 21/6218* (2013.01); *G06Q 10/0835* (2013.01);
(Continued)

(58) Field of Classification Search
CPC ......... G06F 8/60–71; G06F 21/60–629; H04L 63/102–108; H04L 67/34; H04L 41/22; H04L 63/10–108
See application file for complete search history.

(56) References Cited

U.S. PATENT DOCUMENTS 6,161,139 A 12/2000 Win et al.
6,167,567 A * 12/2000 Chiles ....................... G06F 8/65
717/173

(Continued)

FOREIGN PATENT DOCUMENTS

CN 101187993 A 5/2008
CN 104468819 A 3/2015
(Continued)

OTHER PUBLICATIONS

"Controller." Dictionary.com. 2022. https://www.dictionary.com/browse/controller (Aug. 17, 2022).*
(Continued)

*Primary Examiner* — Brendan Y Higa
(74) *Attorney, Agent, or Firm* — Knobbe Martens Olson & Bear LLP

(57) ABSTRACT

The present disclosure provides a method of managing a system and an apparatus therefor. The method of the present disclosure may include providing a menu management tool for managing a menu of a system, setting an item of the menu and an authority to access the item by receiving an input through the menu management tool, and providing, when a terminal having the authority accesses the system, information regarding the item to the terminal.

18 Claims, 12 Drawing Sheets

(51) Int. Cl.
  *H04L 41/0604* (2022.01)
  *H04L 9/40* (2022.01)
  *G06Q 10/08* (2012.01)
  *G06Q 30/06* (2012.01)
  *G06Q 10/0835* (2023.01)
  *G06Q 30/0601* (2023.01)

(52) U.S. Cl.
  CPC ..... *G06Q 30/0641* (2013.01); *H04L 41/0627* (2013.01); *H04L 63/102* (2013.01); *H04L 63/104* (2013.01)

(56) References Cited

U.S. PATENT DOCUMENTS

| | | | |
|---|---|---|---|
| 6,405,238 B1 | 6/2002 | Votipka | |
| 6,453,353 B1 | 9/2002 | Win et al. | |
| 7,827,204 B2 | 11/2010 | Heinzel et al. | |
| 7,913,247 B2* | 3/2011 | Diederichs | G06F 8/65 717/169 |
| 8,386,779 B2* | 2/2013 | King | G06F 21/604 713/168 |
| 8,874,561 B2 | 10/2014 | Heinzel et al. | |
| 10,999,425 B2* | 5/2021 | Kim | H04M 3/4931 |
| 2003/0037040 A1 | 2/2003 | Beadles et al. | |
| 2004/0076444 A1 | 4/2004 | Badovinac et al. | |
| 2004/0225637 A1 | 11/2004 | Heinzel et al. | |
| 2004/0225718 A1 | 11/2004 | Heinzel et al. | |
| 2004/0266396 A1 | 11/2004 | Heinzel et al. | |
| 2006/0183477 A1 | 8/2006 | Bocking et al. | |
| 2007/0028120 A1* | 2/2007 | Wysocki | H04L 63/061 713/192 |
| 2008/0294536 A1 | 11/2008 | Taylor et al. | |
| 2009/0144098 A1 | 6/2009 | Korat et al. | |
| 2012/0254671 A1 | 10/2012 | Francisco et al. | |
| 2013/0111562 A1 | 5/2013 | Lee et al. | |
| 2015/0026778 A1* | 1/2015 | Faitelson | G06F 21/604 726/4 |
| 2018/0121646 A1* | 5/2018 | Sakanashi | H04L 63/00 |

FOREIGN PATENT DOCUMENTS

| | | |
|---|---|---|
| CN | 109960904 A | 7/2019 |
| EP | 1 475 734 A2 | 11/2004 |
| JP | 2004-086244 A | 3/2004 |
| JP | 2012-203614 A | 10/2012 |
| KR | 10-2003-0039336 A | 5/2003 |
| KR | 10-1132238 B1 | 3/2012 |
| KR | 10-2013-0047193 A | 5/2013 |
| KR | 10-2018-0033948 A | 4/2018 |
| KR | 10-1891240 B1 | 8/2018 |
| KR | 10-1950422 B1 | 2/2019 |
| KR | 10-2076162 B1 | 2/2020 |

OTHER PUBLICATIONS

Nav Menu Roles Homepage; May 23, 2015.
International Search Report for PCT/KR2020/009827, dated Dec. 17, 2020.
Word Press Homepage "Menu access restrictions by membership level—Nav menu Roles" May 23, 2015.

* cited by examiner

METHOD FOR MANAGING SYSTEM AND APPARATUS THEREFOR

BACKGROUND

Technical Field

This disclosure relates to a method of managing a system and an apparatus therefor.

Description of the Related Art

In related arts, an inline frame (iframe) or re-direction method may be used to configure a component, for example, a menu bar in each domain. However, such typical methods may provide relatively low web accessibility and may have security issues. Also, since a plurality of domains related to the same system constitutes different types and designs of components, a sense of unity between the domains may be reduced.

In addition, when a change in common components between the domains is required, the component of each of the domains needs to be identically modified and re-implemented, so there is a difficulty in forming a sense of unity and cumbersome procedures. This may lead to wasting a lot of resources and time.

Also, in the related arts, an alert may be made using e-mail or a text message to send the alert to users of a plurality of domains. However, the typical method may not track an action of the user after the alert is sent, and there is an inconvenience in that the alert is to be individually made for the users of the plurality of domains.

SUMMARY

Technical Goals

An aspect provides a method of managing a system and an apparatus therefor. Technical goals to be achieved through the example embodiments are not limited to the technical goals as described above, and other technical tasks can be inferred from the following example embodiments.

Technical Solutions

According to an aspect, there is provided a method of managing a system, the method including providing a menu management tool for managing a menu of a system, setting an item of the menu and an authority to access the item by receiving an input through the menu management tool, and providing, when a terminal having the authority accesses the system, information on or regarding the item to the terminal.

According to another aspect, there is also provided an apparatus for system management, the apparatus including a communication device and a controller, wherein the controller is configured to provide a menu management tool for managing a menu of a system through the communication device, set an item of the menu and an authority to access the item by receiving an input through the menu management tool, and provide, when a terminal having the authority accesses the system, information on the item to the terminal.

According to still another aspect, there is also provided a terminal including a communication device, a display, and a controller, wherein the controller is configured to receive information on an item of a menu for which an authority of the terminal to access is set from a system managing apparatus through the communication device, and output a menu screen through the display based on information on the item of the menu.

Details of example embodiments are included in the detailed description and drawings.

Effects

According to the present disclosure, since a plurality of domains related to a system may constitute a menu having the same format and data, it is possible to form a sense of unity between different domains.

Further, since changes in a menu and an authority are collectively provided to a plurality of domains through a network, it is possible to reflect the changes in real time and achieve an ease of management.

Further, according to the present disclosure, when an alert requires a subsequent action of a user, whether the alert is processed may be verified until an input of the user is received. Through this, it is possible to track an action of the user for the alert.

Further, since both internal users and external users may check an alert in the same area of corresponding domains, it is possible to achieve an ease of integrated management for a plurality of users.

Effects are not limited to the aforementioned effects, and other effects not mentioned will be clearly understood by those skilled in the art from the description of the claims.

DETAILED DESCRIPTION

Terms used in the embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meanings: A alone; B alone; C alone; both A and B together; both A and C together; both B and C together; and all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, embodiments of the present disclosure will be described in detail with reference to the drawings so that those skilled in the art can easily carry out the present disclosure. The present disclosure may be embodied in many different forms and is not limited to the embodiments described herein.

Figure 1:
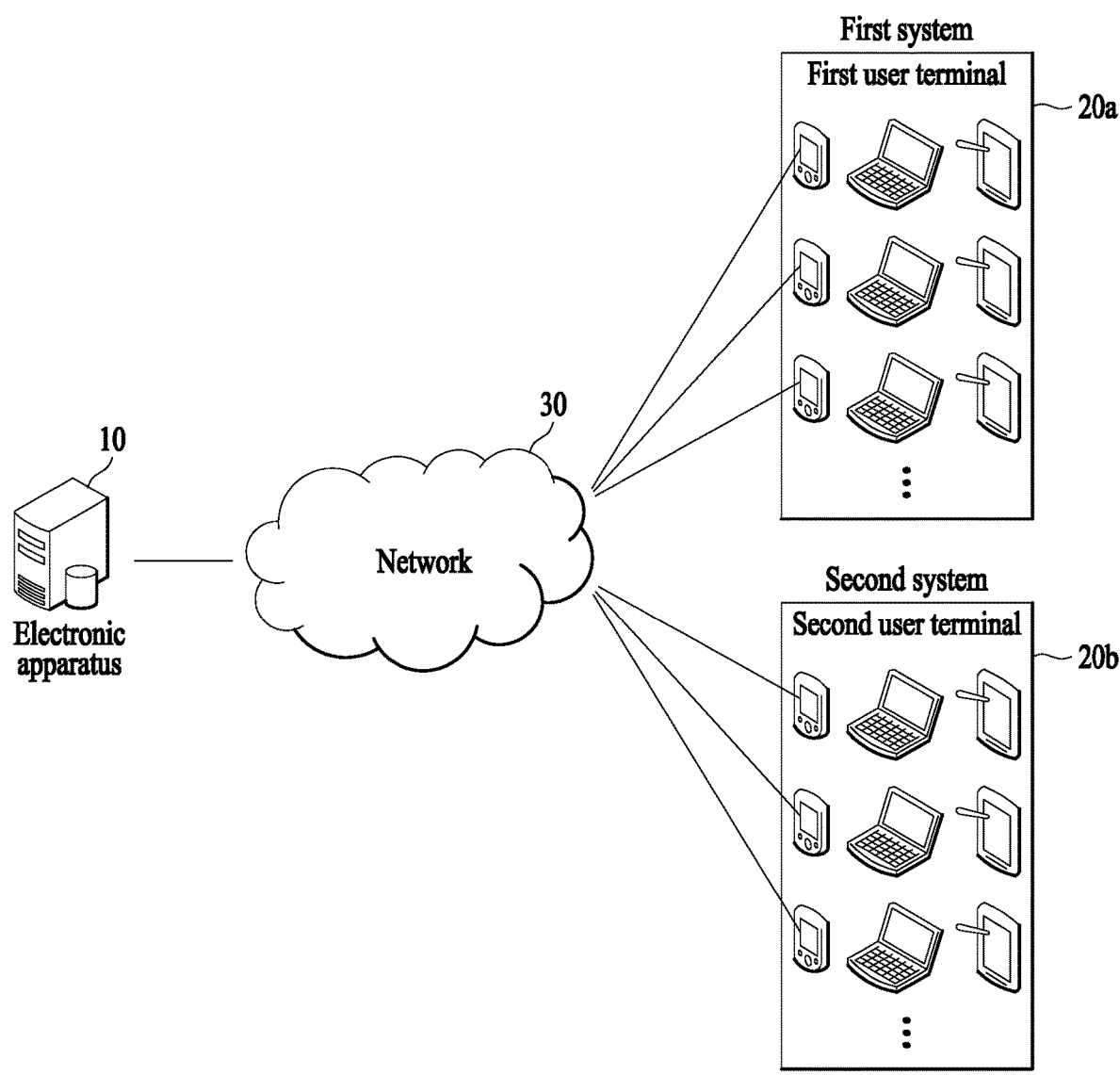
FIG. 1 illustrates an operation system for system management according to an example embodiment of the present disclosure.

FIG. 1 is a diagram illustrating a method for system management according to an example embodiment of the present disclosure.

A method for system management according to the present disclosure may be performed by an electronic apparatus 10 and a user terminal 20. FIG. 1 illustrates components related to the present embodiment. However, it is apparent to those skilled in the art that other general-purpose components may be further included in addition to the components illustrated in FIG. 1.

The electronic apparatus 10 and the user terminal 20 may communicate with each other through a network 30. The network 30 may include any one or combinations of a local area network (LAN), a wide area network (WAN), a value added network (VAN), a mobile radio communication network, and a satellite communications network. Also, the network is a comprehensive data communication network that allows network components of FIG. 1 to smoothly communicate with each other, and may include a wired Internet, a wireless Internet, and a mobile wireless communication network. The wireless communication may be, for example, wireless fidelity (Wi-Fi) LAN, Bluetooth™, Bluetooth low energy, ZigBee, Wi-Fi direct (WFD), ultra wideband (UWB), infrared Data Association (IrDA) communication, and near field communication (NFC) but not is limited thereto.

The electronic apparatus 10 of the present disclosure may be an apparatus included in a server for system management and may provide a platform for system management. Specifically, the electronic apparatus 10 may provide a menu management tool for managing a menu of a system. The menu management tool may be provided to a plurality of systems through the network 30. The user terminal 20 may be connected to a system to access the menu management tool.

According to an example embodiment, the system may be a website related to the present disclosure, and a user may access the system through the user terminal 20. For example, a first system may be a website related to logistics. A user related to the logistics may access the first system using a first user terminal 20a. Also, a second system may be a website related to a contract. A user subject to the contract may access the second system using a second user terminal 20b. The menu management tool of the present disclosure may be a tool to be used in a plurality of systems in common.

Further, the electronic apparatus 10 may receive a user input that is input by the user terminal 20 using the menu management tool through the network 30. The user input may be an input for an item of a menu of the system and an authority to access the item. In an example embodiment, the electronic apparatus 10 may receive the user input and set the input for the item of the menu and the authority to access the item. In other words, the electronic apparatus 10 may map the item of the menu and the authority to access the item. A description of such will be given in the present disclosure with reference to the drawings.

Further, when the user terminal 20 is connected, the electronic apparatus 10 may provide information on or regarding the set item of the menu to the user terminal 20. For example, based on an authority assigned to the user terminal 20, the electronic apparatus 10 may provide information on an item mapped to the authority.

Further, the electronic apparatus 10 may receive a plurality of alerts from the plurality of systems. Here, the plurality of alerts may be alerts related to the user and having a common form. Referring to FIG. 1, for example, the electronic apparatus 10 may receive alerts related to a specific user and having the same form from the first system and the second system. Specifically, the first user terminal 20a may be connected to the first system to provide a first alert in a previously provided form. Also, the second user terminal 20b may be connected to the second system to provide a second alert in the same form as the first alert.

Further, the electronic apparatus 10 may commonly provide the plurality of alerts received from the plurality of systems to the user terminal 20. In this instance, the plurality of alerts may be classified by type. Also, the electronic apparatus 10 may verify whether the provided alerts are processed. A description of such will be given in the present disclosure with reference to the drawings.

The user terminal 20 of the present disclosure may manage the system through the network 30. Particularly, the user terminal 20 may manage the menu of the system and an alert to be provided to the user. Specifically, the user terminal 20 may receive the menu management tool from the electronic apparatus 10 and input the item of the menu of the system and the authority to access the item through the menu management tool. Also, the user terminal 20 may receive the item of the menu for which an access authority is set from the electronic apparatus 10 and output a menu screen configured based on the item. The user terminal 20 may provide, to the electronic apparatus 10, an alert that is related to the user and has a previously provided form. Also, the user terminal 20 may receive a plurality of alerts related to the user and classified by type from the electronic apparatus 10 and output the alerts to the user.

In the past, it has been difficult to form a common component in each domain due to physically separated or different business areas despite being related to the same system. That is, since different domains are assigned to business areas, a component (for example, a menu bar) may be formed in each domain individually. Due to this, a sense of unity between domains may be reduced despite being related to the same system. Particularly, when a system update is required, the update may be performed individually in each domain, which may cause a difference due to a presence or absence of the update.

Such issues may be more pronounced when common components are to be modified collectively and may cause a waste of time and a lot of resources. The present disclosure is to provide a method for system management to solve the aforementioned issues. More specifically, the present disclosure proposes a menu management tool for managing a menu of a system such that a plurality of domains is accessible in common. A related description will be given in detail with reference to FIG. 2.

Figure 2:
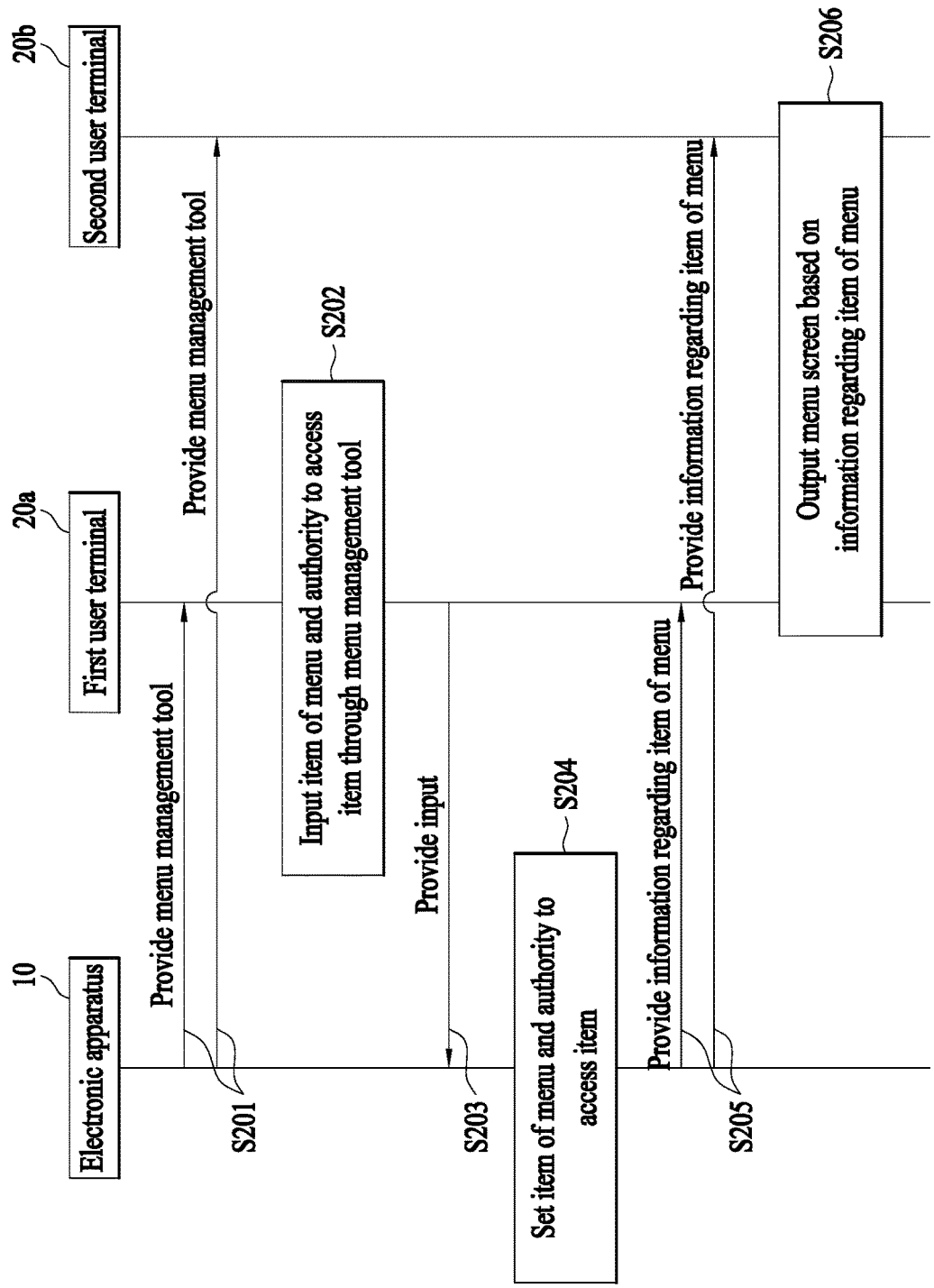
FIG. 2 is a flowchart illustrating a method of managing a system through a menu management tool according to an example embodiment of the present disclosure.

FIG. 2 is a flowchart illustrating a method of managing a system through menu management tool according to an example embodiment of the present disclosure. The electronic apparatus 10 may communicate with a plurality of systems through the network 30. A user may access a system through the user terminal 20. FIG. 2 illustrates the first user terminal 20a and the second user terminal 20b as a plurality of user terminals for accessing a specific system.

In operation S201, the electronic apparatus 10 may provide a menu management tool for managing a menu of a system to the plurality of user terminals. In operation S202, the first user terminal 20a included in the plurality of user terminals may input an item of the menu and an authority to access the item through the received menu management tool. In operation S203, the first user terminal 20a may provide an input for the item of the menu and the authority to access the item to the electronic apparatus 10.

The electronic apparatus 10 may receive the input for the item of the menu and the authority to access the item from the user terminal 20a, and then set the item of the menu and the authority to access the item in operation S204. Specifically, the electronic apparatus 10 may map the authority to access the item of the menu to the corresponding item. A related description will be given in detail with reference to FIG. 3.

In operation S205, the electronic apparatus 10 may provide information on or regarding the item of the menu for which an access authority is set to the first user terminal 20a and the second user terminal 20b. The first user terminal 20a and the second user terminal 20b may configure a menu screen based on the provided information on the item of the menu and output the menu screen in operation S206.

In terms of operations S204 and S205, the electronic apparatus 10 may provide the information on the item in a computer-readable programming language so as to be referenced. For example, the information on the item may be written in source code and uploaded to a contents delivery network (CDN) so as to be referenced through a URL. In this case, the user terminal 20 may be a mobile terminal or an electronic device such as a laptop computer, so that the user accesses the URL through the user terminal 20 to receive the information on the item of the menu in real time. For this, the plurality of user terminals 20a and 20b of the present disclosure may configure an upper end menu and a lower end menu based on the same source code, thereby configuring a menu screen having the same function and design.

Figure 3:
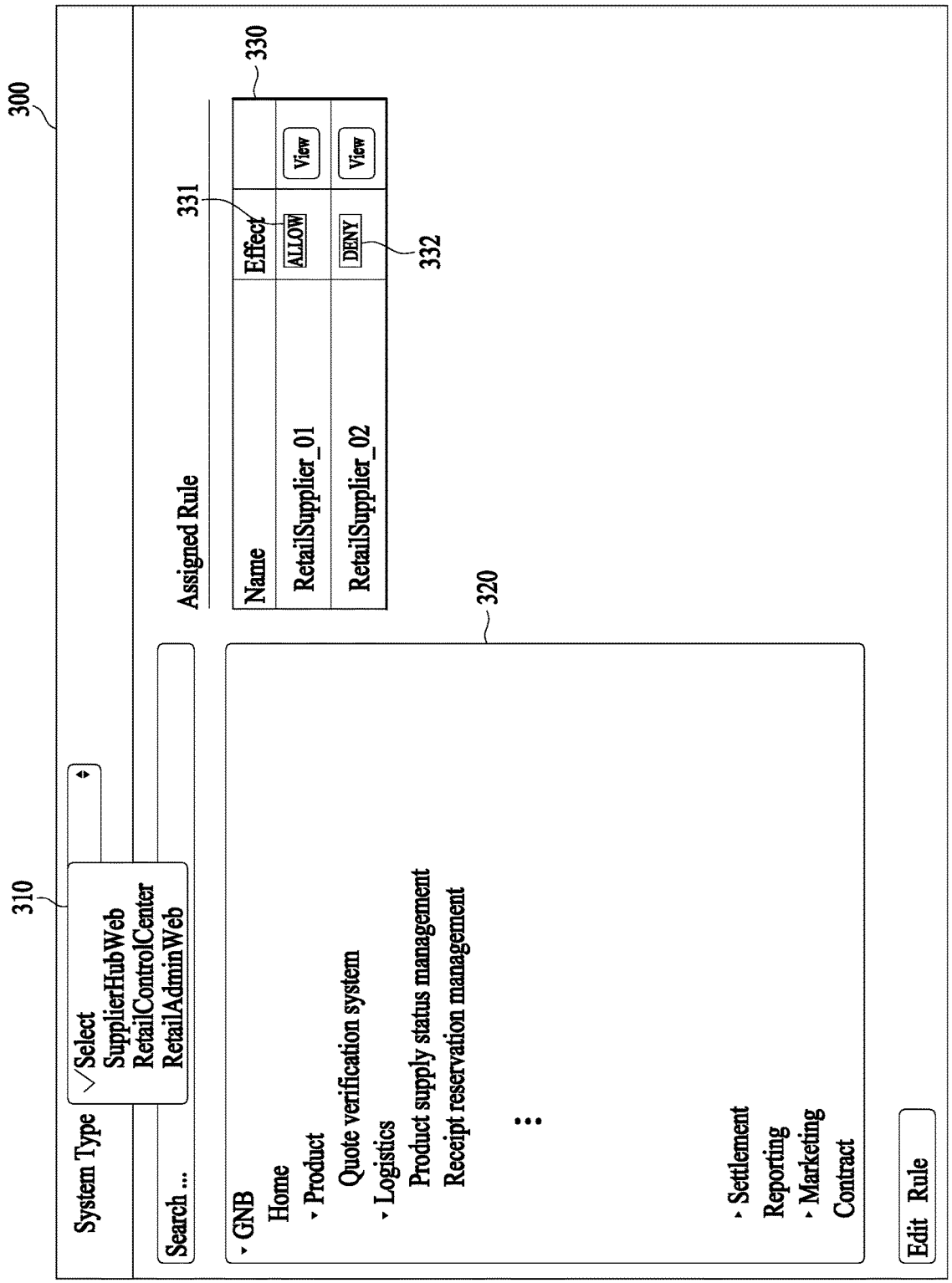
FIG. 3 is a diagram illustrating a menu management tool according to an example embodiment of the present disclosure.

Meanwhile, according to operation S202, the first user terminal 20a according to an example embodiment of the present disclosure may receive the item of the menu and the authority to access the item from the user through a menu management tool 300 as an input. FIG. 3 illustrates the menu management tool 300 according to an example embodiment of the present disclosure.

In the example embodiment, the first user terminal 20a may receive an input of selecting a type of a system before an input for an item of a menu is received. Specifically, the user may select a system to access through the first user terminal 20a from a system-type item 310. The type of the system may include, for example, a logistics-related system, a seller-related system, and a manager-related system. Items of an upper end menu and Items of a lower end menu may vary based on the type of the system.

According to an example embodiment of the present disclosure, the first user terminal 20a may receive an item of the upper end menu and an item of a lower end menu as inputs and receive an authority of a terminal to access each of the items. Specifically, the user may input the item of the upper end menu in a menu setting item 320. According to an example embodiment, the upper end menu may be configured in one column or configured in two columns. Furthermore, the upper end menu may be configured in three columns and is not limited thereto. The upper end menu configured in two columns may include a first menu and a second menu. The second menu may be a sub-menu of the first menu, located below the first menu, and include a detailed item of the item of the first menu. In some cases, the first menu may include an item that does not have a sub-item. In such cases, the second menu may not exhibit to the user. A related description will be given in detail with reference to FIG. 4.

Meanwhile, according to an example embodiment of the present disclosure, the first user terminal 20a may set an authority to access an item of a menu at an authority setting item 330 of the menu management tool 300. The authority may include an allowance authority and a denial authority. Specifically, the user may input an allowance authority 331 for a first seller and input a denial authority 332 for a second seller in a predetermined item of the menu through the authority setting item 330. In this case, when such inputs are received, the electronic apparatus 10 may set an access of the first seller to be allowed and an access of the second seller to be denied for the corresponding item. When a terminal of the first seller accesses the system, the item of the menu set in the system may be exposed on a screen of the terminal. In contrast, when a terminal of the second seller accesses the system, the item may not be exposed on the screen of the terminal because the second seller does not have an authority. For example, the authority to access the item may be information designated for each user terminal or may be distinguished using an ID of a user connected to a terminal.

According to an example embodiment of the present disclosure, the authority to access the item of the menu may be set by the electronic apparatus 10 for each user terminal or set for the plurality of user terminals simultaneously. Also, a plurality of user IDs and allowance or denial authorities thereof may be listed at the authority setting item 330.

The authority of each user terminal to access the item of the menu may be set differently based on the type of the system and the item of the menu, for example, the item of the upper end menu. The authority may be modified through the user terminal 20 and the electronic apparatus 10 even once set. Also, the electronic apparatus 10 may deactivate the authority instead of modifying the authority, thereby changing whether the access of the user terminal is allowed.

According to an example embodiment of the present disclosure, the authority to access the item of the menu may be changed based on whether the terminal accessing the system is a terminal of an internal user of the system. Specifically, when the terminal accessing the system is the terminal of the internal user of the system, the terminal may be set to access the item related to settings and management of the system. For example, the allowance authority may be set for only the terminal of the internal user to access an item to which an access of an external user is restricted, such as an item for setting a common use component of the system, an item for managing a type of the system, an item related to authority setting, and the like.

When the terminal accessing the system is a terminal of an external user, the authority to access the item may be changed based on whether the external user is a user related to the system or a third part irrelevant to the system. When a terminal of an external user related to the system accesses the system, the authority may be set such that the external user is able to access items related to the system, but not as much as the items accessible by the internal user. For example, when an external user (e.g., seller) related to logistics accesses a logistics system, the allowance authority may be set with respect to items in which the external user needs to receive information from the internal user or needs to provide information to the internal user. Such items may include, for example, an item related to logistics, an item related to a settlement, and an item related to a contract.

As described above, the user terminal 20 may receive inputs of a user for a type of a system, an item of a menu, and an authority to access the item, so that the electronic apparatus 10 receives the inputs and set the item of the menu and the authority. Such processes may be performed substantially at the same time.

Figure 4:
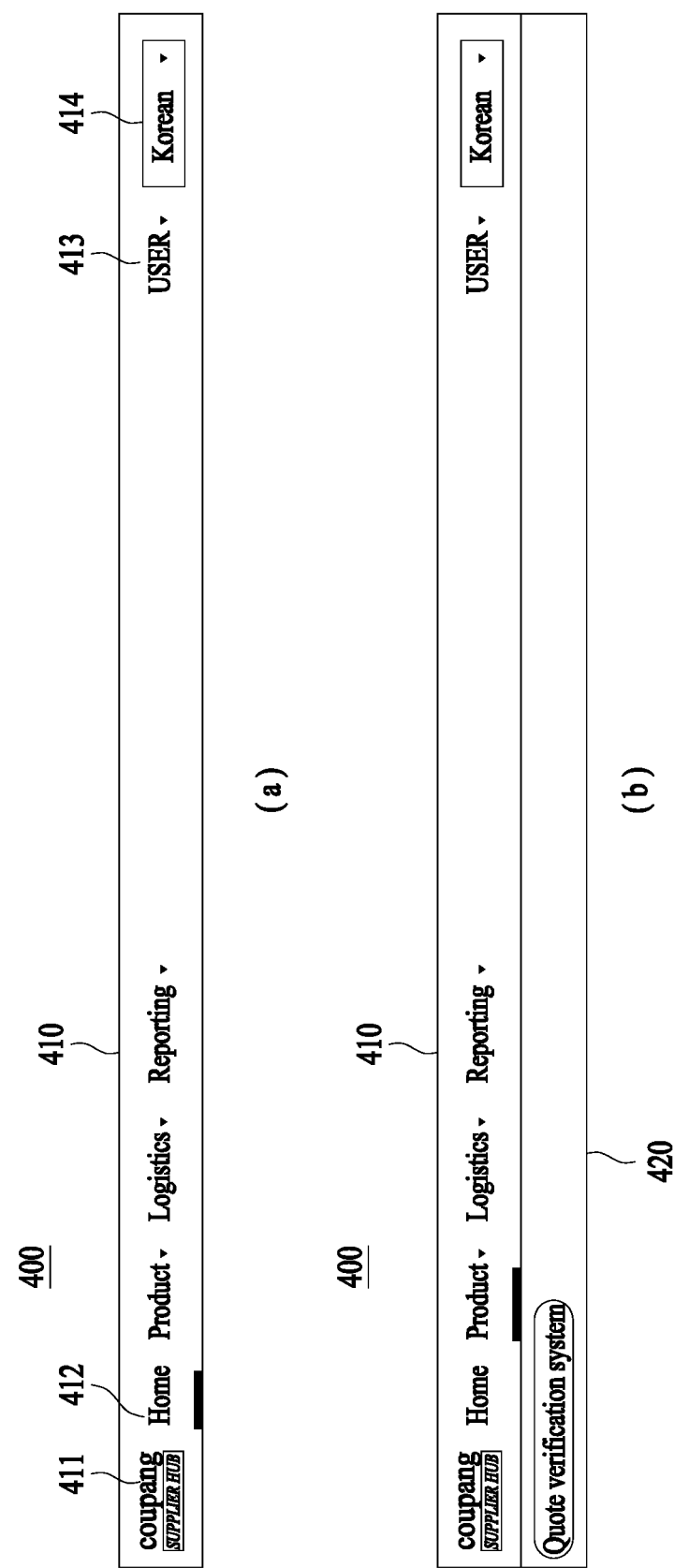
FIG. 4 is a diagram illustrating an upper end menu according to an example embodiment of the present disclosure.

FIG. 4 is a diagram illustrating an upper end menu 400 according to an example embodiment of the present disclosure.

(a) of FIG. 4 shows an upper end menu of one column and (b) shows an upper end menu of two columns. Referring to (a) of FIG. 4, a first menu 410 may be an uppermost menu and may include at least one of a system logo 411, an alert related item 412, a user information related item 413, and a language setting item 414. Also, referring to (b) of FIG. 4, the second menu 420 may be a next uppermost menu and may include a detailed item of an item of the first menu 410.

According to an example embodiment, when an input of a user for the system logo 411 (for example, an action of a user touching or clicking the system logo) is received through the user terminal 20, the user terminal 20 may switch any screen to a screen of the alert related item. A description of such will be given in detail later.

According to an example embodiment, the alert related item 412 may be an item of outputting a plurality of alerts related to a user as contents. Also, the alert related item 412 may be an item of further outputting information on the user as content. For example, the alert related item 412 may indicate an item for outputting a home screen, which is a first screen of a website in general, as content.

The user information related item 413 may be an item for identifying or modifying information on a user of a user terminal accessing the system. For example, the user information related item 413 may identify a user ID and redirect to modify user information. Also, the user terminal may perform a "logout" to be disconnected from the system through the user information related item 413.

The language setting item 414 may be previously set based on a region in which the user terminal accesses the system. The user may change a language of the system through the language setting item 414.

Figure 5:
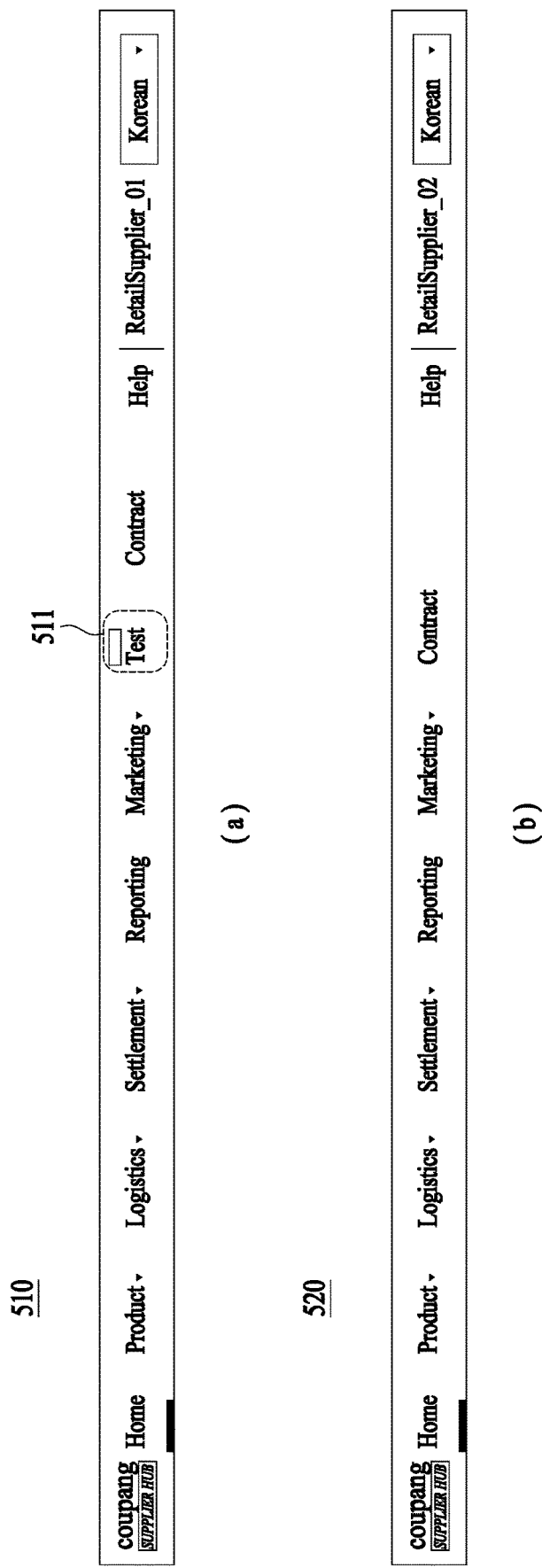
FIG. 5 is a diagram illustrating an upper end menu output based on an authority according to an example embodiment of the present disclosure.

According to an example embodiment of the present disclosure, items of a menu to be output may vary based on an authority assigned to a user terminal. FIG. 5 is a diagram illustrating an upper end menu output based on an authority according to an example embodiment.

FIG. 5 illustrates that an item of an upper end menu is output differently based on an authority set to a user terminal. Specifically, (a) of FIG. 5 shows an upper end menu 510 output on a user terminal for which an allowance authority is set to allow an access to an item. Also, (b) of FIG. 5 shows an upper end menu 520 output on a user terminal for which a denial authority is set to disallow an access to an item.

According to an example embodiment, an allowance authority may be set for the first user terminal 20a to access an item "test" 511. Thus, when accessing the system, the item "test" 511 may be identified as shown in (a) of FIG. 5, so that an access to content of the corresponding item may be allowed. In contrast, a denial authority may be set for the second user terminal 20b not to access the item "test" 511. Thus, when accessing the system, the item "test" 511 may be invisible as shown (b) of FIG. 5) so an access to content of the corresponding item may not be allowed.

Figure 6:
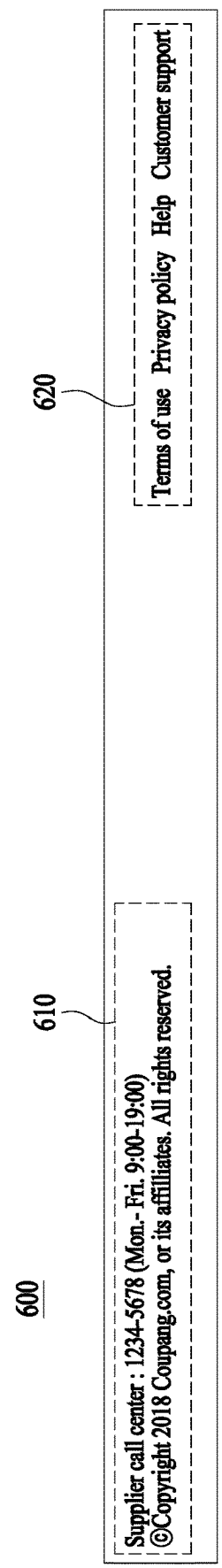
FIG. 6 is a diagram illustrating a lower end menu according to an example embodiment of the present disclosure.

FIG. 6 is a diagram illustrating a lower end menu 600 according to an example embodiment of the present disclosure.

Referring to FIG. 6, the lower end menu 600 may include a system information providing item 610 and a user help providing item 620. The system information providing item 610 may include information such as a contact, an address, and the like for contact with a representative business area that manages a system. Also, the user help providing item 620 may include at least one of terms of use, a privacy policy, help, and customer support, which may be checked by a user of a terminal connected to a system.

Meanwhile, after the user terminal 20 receives a menu management tool from the electronic apparatus 10, the user terminal 20 may receive at least one change in an item of a menu and an authority to access the item from a user. A related description will be given with reference to FIG. 7.

Figure 7:
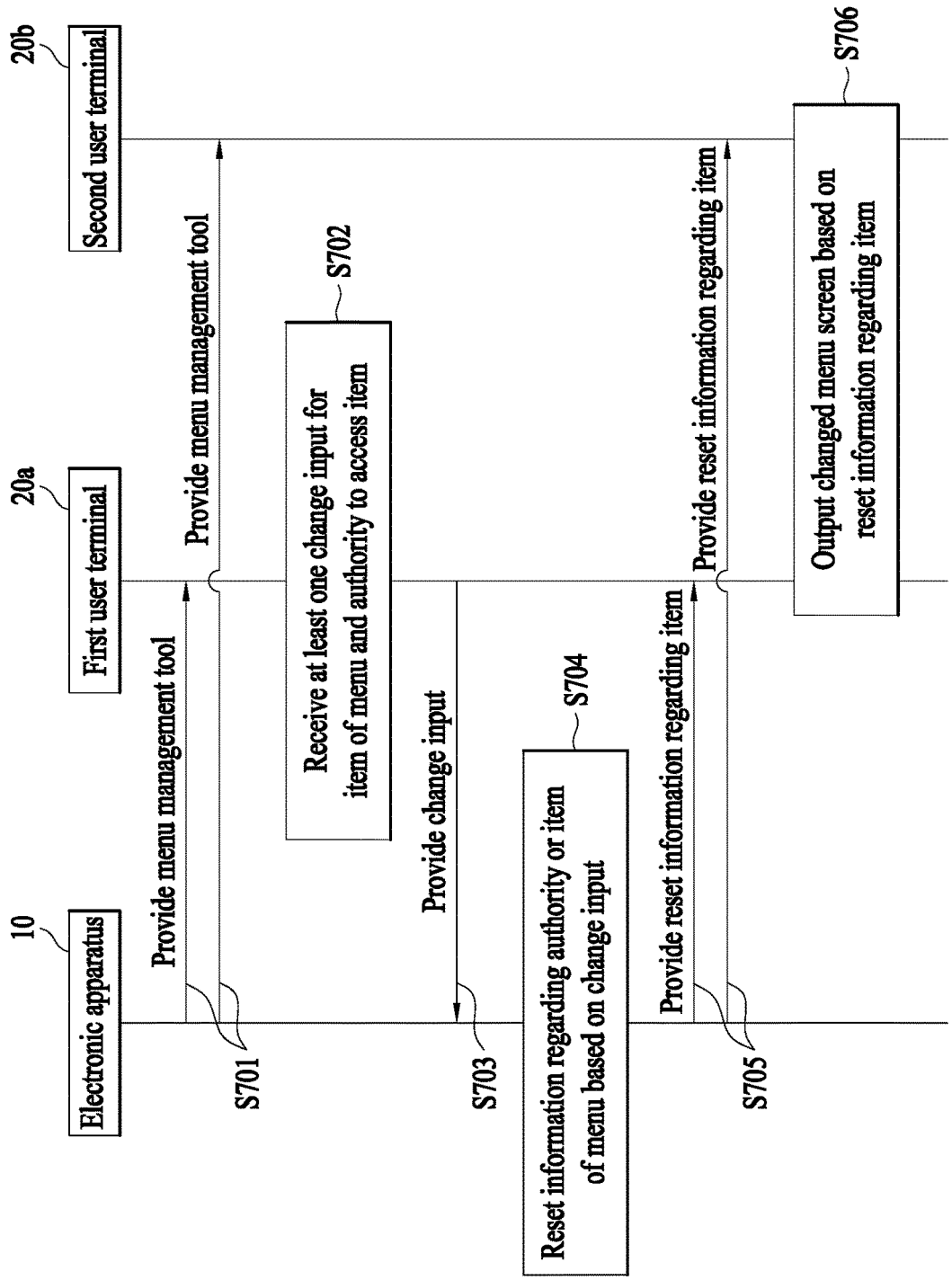
FIG. 7 is a flowchart illustrating a method of managing a system through a menu management tool in a case in which a change input is present according to an example embodiment of the present disclosure.

FIG. 7 is a flowchart illustrating a method of managing a system using a menu management tool in a case in which a change input is present according to an example embodiment of the present disclosure.

As described with reference to FIG. 2, in operation S701, the electronic apparatus 10 may provide a menu management tool to the first user terminal 20a and the second user terminal 20b. In operation S702, the first user terminal 20a included in a plurality of user terminals may receive at least one change input for an item of a menu and an authority to access the item from a user. The change may include, for example, a case in which an item name of the menu is modified, a case in which a number of items is increased or reduced, a case in which an authority to access the item is changed, and a case in which a depth (e.g., columns) of an upper end menu is changed.

In operation S703, the first user terminal 20a receiving the change input may provide the change input to the electronic apparatus 10. In operation S704, the electronic apparatus 10 may reset information on or regarding the authority or the item of the menu based on the received change input. In operation S705, the electronic apparatus 10 may provide the reset information on the item to the plurality of user terminals, for example, the first user terminal 20a and the second user terminal 20b.

In terms of operations S704 and S705, the electronic apparatus 10 may write the changed information of the item of the menu or the authority using a computer-readable programming language. For example, the information on the item may be written in source code and uploaded to a CDN so as to be referenced through a URL. According to an example embodiment, when the changed information requires a lot of modification to the source code, a file connected to the URL may be updated. For example, a depth of the upper end menu may be changed from two columns to three columns. In this example, since a configuration of the menu is changed, the file updated by modifying the source code may be uploaded to the CDN.

Specifically, according to an example embodiment of the present disclosure, the electronic apparatus 10 may upload the modified source code to an online storage through an integrated service providing tool. For example, the electronic apparatus 10 may write an item of a menu and an authority for the item in javascript and upload the item of the menu and the authority to a specific path of a simple storage service (referred to as "S3") through Jenkins. The user terminal 20 may access the javascript file uploaded to the S3 through a proxy server, so that the user identifies recently uploaded information on the item of the menu or the authority.

The first user terminal 20a and the second user terminal 20b may configure a menu screen based on the reset information on the item received from the electronic apparatus 10 and output a changed menu screen in operation S706. According to an example embodiment, the first user terminal 20a and the second user terminal 20b may update the information on the item by referencing the URL. Through this, the changed menu screen may be configured based on the reset information on the item received in real time without a need to perform an additional download or a separate setting operation.

Meanwhile, in a related art, in order to send a notification to any user, it is necessary to provide a notification directly to a user by sending an e-mail or text message individually for each system. Alternatively, users need to refresh a domain themselves to check any change. However, in such cases, it is difficult to realize an integrated management and difficult to track a user's action.

Also, if too many alerts are accumulated without being classified, the alerts may be duplicated or considered as spam information, and thus efficient processing may be required. Particularly, a separate alert processing is required for each internal user and external user of the system, which may cause an inconvenience.

The present disclosure is to provide a method for system management to solve the aforementioned issues. More specifically, the present disclosure proposes an integrated alert providing method. A related description will be given in detail with reference to FIG. 8.

Figure 8:
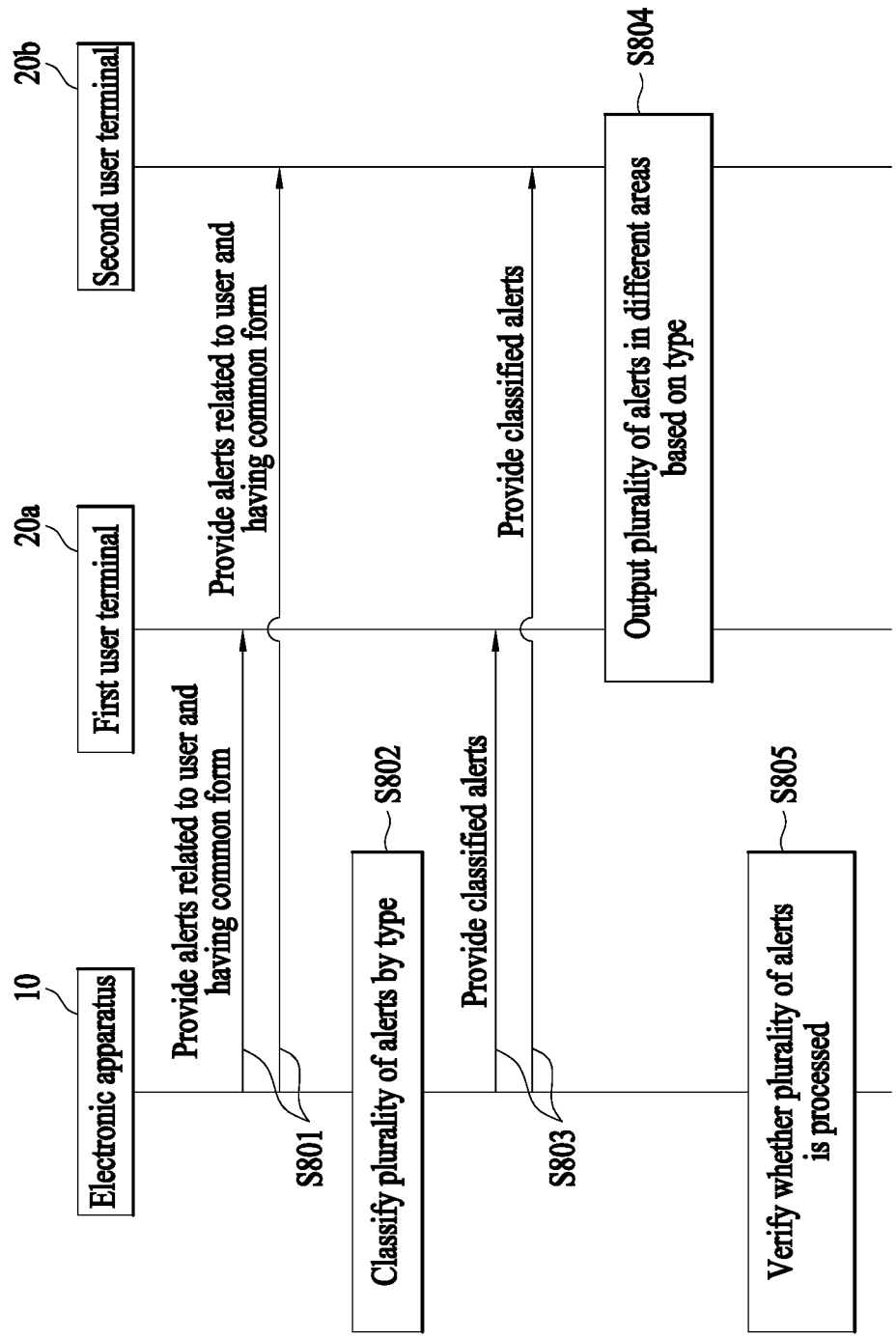
FIG. 8 is a flowchart illustrating a method of providing a plurality of alerts to a user terminal according to an example embodiment of the present disclosure.

FIG. 8 is a flowchart illustrating a method of providing a plurality of alerts to a user terminal according to an example embodiment of the present disclosure.

According to an example embodiment, in operation S801, a plurality of user terminals (the first user terminal 20a and the second user terminal 20b) may provide alerts related to a user and having a common form to the electronic apparatus 10. The first user terminal 20a and the second user terminal 20b may be terminals for accessing the same system or may also be terminals for accessing different systems. For example, even if user terminals are connected to different systems, alerts in the same form may be provided to the electronic apparatus 10 through the same API. Through this, the electronic apparatus 10 may receive a plurality of alerts related to a user and having the same form from a plurality of systems.

Next, the electronic apparatus 10 may provide the plurality of alerts to the first user terminal 20a and the second user terminal 20b. According to an example embodiment, the electronic apparatus 10 may classify a plurality of alerts by type in operation S802 and provide the classified alerts based on the type in operation S803. For example, the plurality of alerts may have a type that requires an immediate check from a user, a type that requires a feedback from the user, and a type that does not require a check or a feedback from the user.

An alert of the type that requires the immediate check from the user may also be referred to as a "news alert." The news alert may be an alert that is always exposed to be viewed on all screens of a system connected to a user terminal. For example, changes in the connected system, changes in a contract or logistics, and changes in data due to a change of a database of a user may be the news alert.

An alert of the type that requires the feedback from the user may also be referred to as a "required alert." The required alert may be an alert that is terminated in response to a predetermined operation being performed after the user checks the alert. For example, a case in which a contract is required to be signed, a case in which an additional document is required to be submitted for a contract, and a case in which an authentication procedure for signing up is required may be the required alert. According to an example embodiment, a system providing the required alert may previously designate an action of a user required for the corresponding alert. Specifically, the system may store an URL in the provided alert so that the user is connected to a domain requiring the action of the user through the URL when the user identifies the alert. For example, when a system connected to a user terminal is a logistics system, and when a required alert provided to a user is an alert for requiring a logistics contract to be signed, the user may be redirected to a contract screen through an URL once the user selects the corresponding alert and may perform an action of signing the contract.

An alert of the type that does not require the check or the feedback from the user may also be referred to as a "notice alert." The notice alert may be an informative alert that is helpful if the user knows. The notice alert may be identified through a link provided by the electronic apparatus 10 even after the alert is terminated.

For each type of the plurality of alerts, information on or regarding a duration in which the corresponding alert is provided to a user may be set in advance. The electronic apparatus 10 may process an alert of which the duration ends as a terminated alert based on the information on the duration based on the type of the alert. According to an example embodiment, the information on the duration may vary based on the type of the alert. Even when the alerts have the same type, the information may vary based on attributes of the alerts. For example, the required alert that requires the feedback from the user may have a duration longer than that of the notice alert. Also, a duration of the required alert related to the contract may be set based on an expiration date of the contract.

In terms of operation S803, according to an example embodiment of the present disclosure, the electronic apparatus 10 may provide the plurality of alerts by grouping. Specifically, the electronic apparatus 10 may group alerts received from a plurality of systems for a predetermined period of time among the alerts classified as the same type, based on attributes of the alerts and systems from which the alerts are provided, and provide the grouped alerts.

According to an example embodiment, the electronic apparatus 10 may identify a type of a first alert, an attribute of the first alert, and a system that provides the first alert. When a second alert having the same attribute and type is provided from the same system during a predetermined standby time, the electronic apparatus 10 may group the first alert and the second alert. And while updating the standby time, the electronic apparatus 10 may wait for an additional alert. When an alert having the same type and attribute is not provided from the same system until the standby time ends, the electronic apparatus 10 may terminate the waiting and provide the grouped alerts to the user terminal 20. For example, among alerts provided from the logistics system for the predetermined standby time, the first alert may be a notice alert related to an order information change, the second alert may be a notice alert related to an order cancelation, and a third alert may be a notice alert related to an order information change. In this example, the first alert and the third alert may be grouped into a group related to the order information change, and then provided to the user terminal 20. According to an example embodiment, when a number of alerts grouped into the same group increases to be greater than or equal to a predetermined number before the end of the standby time, the electronic apparatus 10 may terminate grouping and provide a group of the corresponding alerts to the user terminal 20. When a total sum of the updated standby time reaches a maximum time, the electronic apparatus 10 may terminate grouping and provide a group of the corresponding alerts to the user terminal 20.

The electronic apparatus 10 and the user terminal 20 of the present disclosure may manage the plurality of alerts by system, by alert type, and by alert attribute through the grouping of the alerts. Through this, an efficiency of alert management may increase, an alert duplication may be prevented, and an alert may be prevented from being considered as spamming.

Figure 9:
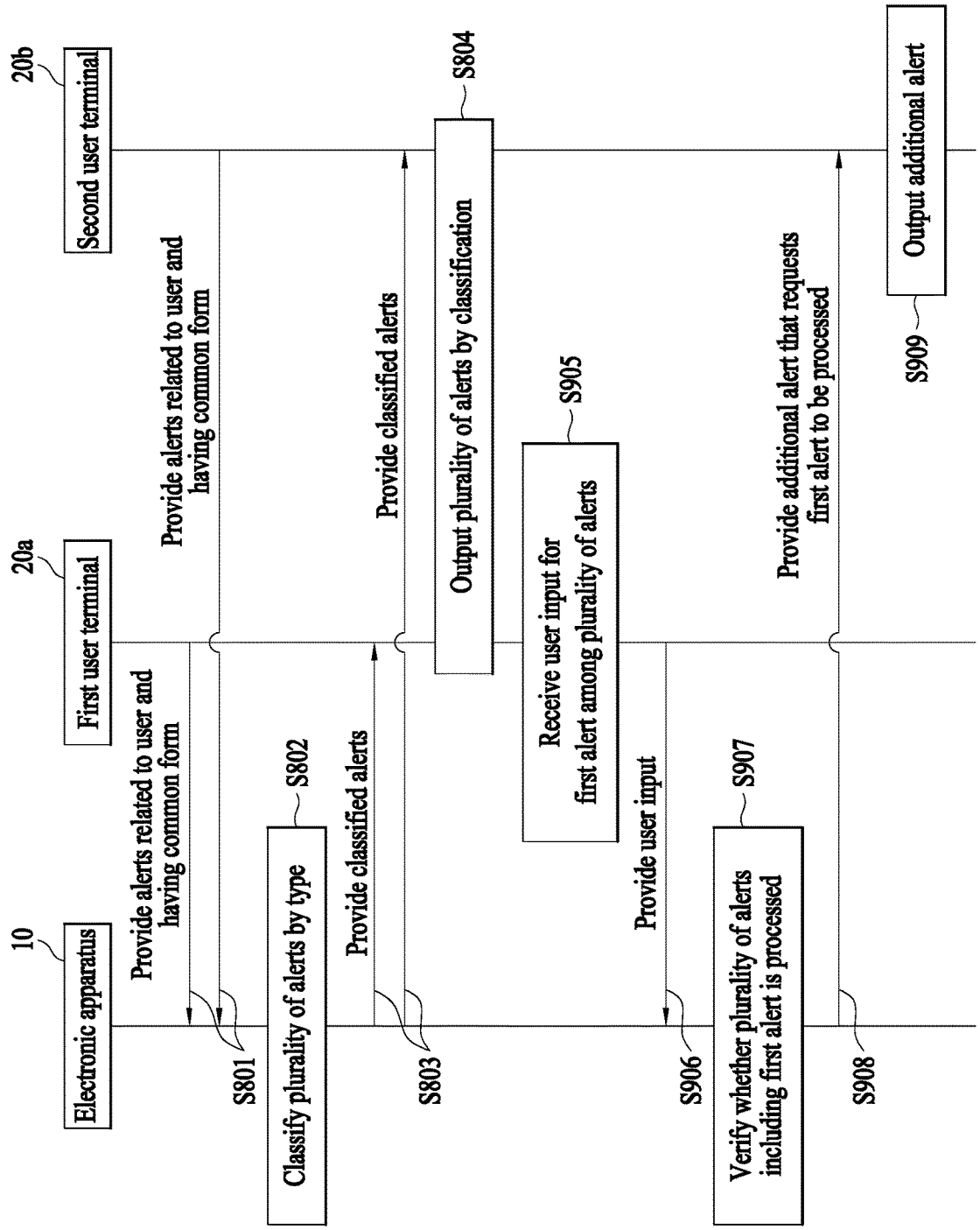
FIG. 9 is a flowchart illustrating a method of verifying, by an electronic apparatus, whether an alert is processed according to an example embodiment of the present disclosure.

Referring back to FIG. 8, in operation S804, the first user terminal 20a and the second user terminal 20b may output the provided alerts. In this instance, the plurality of alerts may be output in different areas based on the type. In operation S805, the electronic apparatus 10 may verify whether the plurality of alerts is processed. According to an example embodiment, when an alert is a required alert that requires a feedback of the user, the electronic apparatus 10 may identify an action of a user responding to the alert. FIG. 9 is a flowchart illustrating a method of verifying, by an electronic apparatus, whether an alert is processed according to an example embodiment of the present disclosure.

In operation S905, the user terminal may receive a user input for an alert after operation S804. For example, since a required alert requires a feedback about the alert from a user, the user terminal may receive a user input for the required alert.

According to an example embodiment, the first user terminal 20a may receive a user input for a first alert (for example, a required alert among a plurality of alerts) in operation S905 and provide the received user input to the electronic apparatus 10 in operation S906. In operation S907, the electronic apparatus 10 may verify whether the plurality of alerts including the first alert is processed.

When the user input for the first alert is absent for a predetermined period of time, the electronic apparatus 10 may provide an additional alert that requests the first alert to be processed to the user terminal 20. For example, an alert that requests a company to sign a contract may be output on a user terminal connected to a contract system. In this example, when a preset time elapses without the company checking the alert, the electronic apparatus 10 may provide an alert that requests the contract to be signed to the user terminal again. According to an example embodiment, an additional alert may be provided and output through a system connected to a user terminal, and may also be provided using an e-mail or text message in a typical way.

Referring to FIG. 9, the first user terminal 20a may receive the user input for the first alert and, the second user terminal 20b may not. When a user input for the first alert is not received from the second user terminal 20b for a predetermined period of time, the electronic apparatus 10 may provide an additional alert that requests the first alert to be processed to the second user terminal 20b in operation S908. In operation S909, the second user terminal 20b may output the additional alert to receive the user input for the first alert.

According to an example embodiment, the user terminal 20 may provide information on an action of the user to the electronic apparatus 10 in real time. For example, information on a time at which the user identifies the alert, a time at which a feedback action is made, a time at which the alert is terminated, and a reason for alert termination may be provided to the electronic apparatus 10. The electronic apparatus 10 may store the information on the action of the user in a database. The stored information on the action of the user may be used to track the action of the user for the alert. Particularly, the information on the action of the user may be used to verify whether the user processes the alert or generate statistics information.

Specifically, according to an example embodiment of the present disclosure, the electronic apparatus 10 may receive the information on the action of the user, generate statistics information related to the plurality of alerts, and provide the generated statistics information to the user terminal 20. The statistics information may include information on a proportion of an alert processed by the user among the plurality of alerts.

The electronic apparatus 10 may acquire alert types and attributes of the plurality of alerts provided by the plurality of systems and receive a time at which the user identifies the alert, a time at which a feedback action is made, a time at which the alert is terminated, a reason for alert termination, and the like from the user terminal 20. Based on such, the electronic apparatus 10 may generate statistics information.

According to an example embodiment, the electronic apparatus 10 may generate alert-generated statistics information based on an attribute of an alert. For example, the electronic apparatus 10 may confirm that among a plurality of alerts provided by a logistics system, there are 100 alerts related to a logistics contract signing request and 50 alerts related to whether a logistics contract is completed.

The electronic apparatus 10 may calculate a ratio of identified alerts compared to alerts output for each user. For example, the electronic apparatus 10 may receive information on a time at which the user identifies an alert "amendment of terms and conditions and request for reconfirmation", check whether the alert is identified for each seller, and statistically calculate a number of identified alerts compared to all alerts.

The electronic apparatus 10 may calculate a ratio of output alerts compared to provided alerts. For example, when the user terminal receives an excessively large number of alerts, a specific alert may be pushed behind and thus, not be output on a screen with an item related to the alert. In this case, the alert may not be exposed on the screen unless the user selects and identifies the alerts. Through this, statistics information may be taken into consideration to prove that the user has ever been identified the alert.

The electronic apparatus 10 may calculate a ratio of terminated alerts compared to all alerts for each user. For example, in general, a required alert that requests a signature for a contract may be terminated with the user performing a signing action. However, an alert may also be terminated as a duration for which the alert is provided elapses. Thus, the electronic apparatus 10 may receive information on a time at which a feedback action is made or a time at which an alert is terminated, and generate statistics information for each user to verify which alert is terminated in response to the feedback action of the user or is terminated as the duration elapses due to an absence of the feedback action. Based on the statistics information, companies that do not regularly sign contacts may be identified and other types of requests for signature may be considered to those companies.

When the alert is processed as being terminated, the electronic apparatus 10 may generate statistics information by receiving information on or regarding a reason for alert termination. The alert may be terminated due to an action of the user, terminated as a duration of the alert elapses, or terminated by an administrator recalling the alert.

For example, when information indicating that a user has signed a contract is received in response to a required alert requesting a signature of the contract, the electronic apparatus 10 may verify a reason for alert termination as the action of the user. When the action of the user is not made within two weeks that is a duration set for the required alert, the electronic apparatus 10 may receive information on alert termination after two weeks from the provision of the alert. In this case, the electronic apparatus 10 may verify that the alert is terminated because the duration of the alert elapses.

When information indicating that the user has input an account number is received in response to a required alert requesting for the account number, the electronic apparatus 10 may verify that a reason for alert termination as the action of the user. Alternatively, for a required alert that requests a signature for a contract on a promotion starting 15 days later, information on alert termination may be received after 15 days from the provision of the alert. In this case, the electronic apparatus 10 may verify that the alert is terminated because the duration of the alert elapses.

Figure 10:
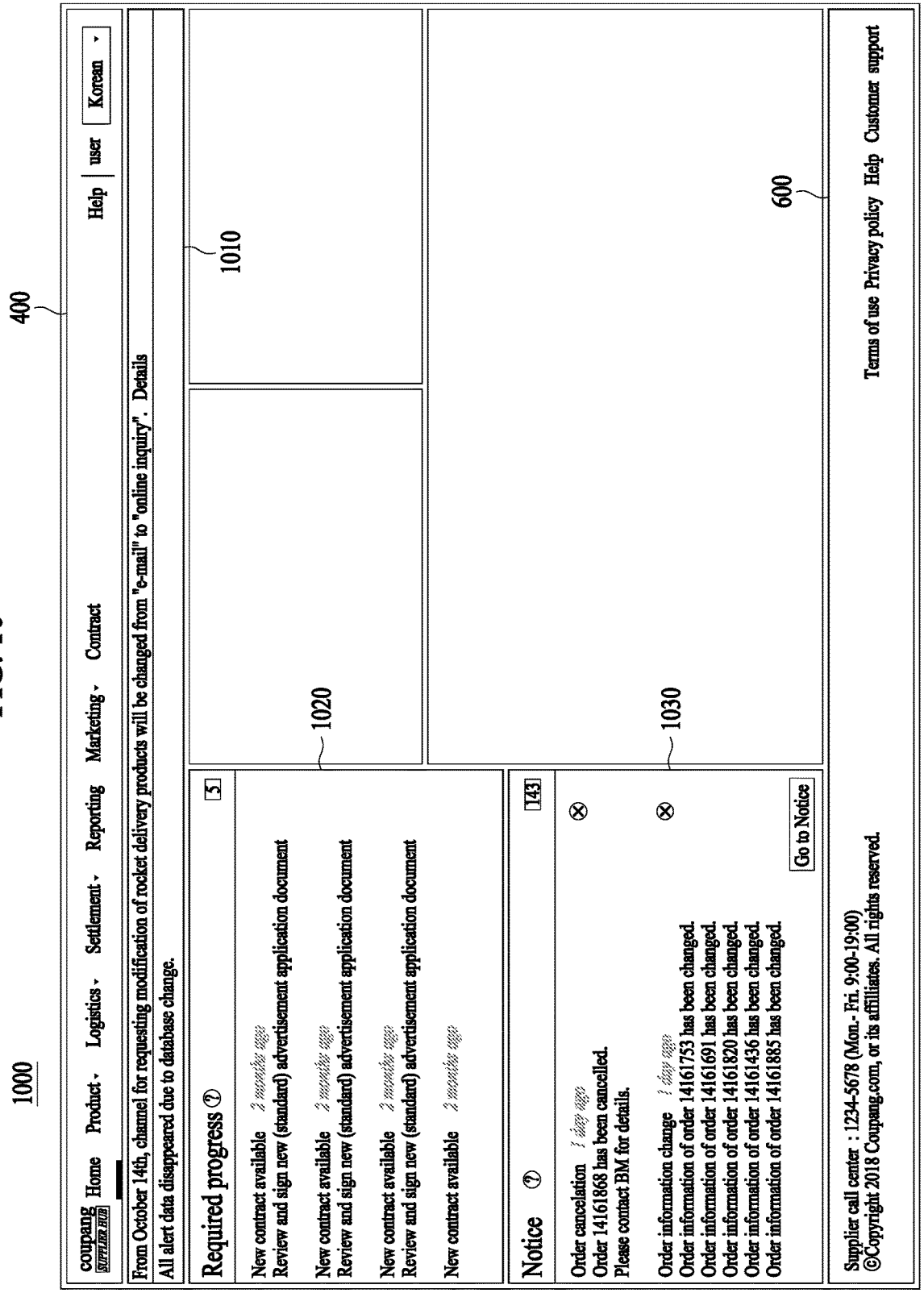
FIG. 10 is a diagram illustrating a screen in which a plurality of alerts is displayed according to an example embodiment of the present disclosure.

Meanwhile, in operation S804, the plurality of alerts may be output in different areas based on a type. FIG. 10 is a diagram illustrating a screen on which a plurality of alerts is output according to an example embodiment of the present disclosure. Here, a screen 1000 may be a screen in which content corresponding to an item related to an alert is output, and may indicate a home screen which is generally a first screen of a web site.

Specifically, the user terminal 20 may output a plurality of alerts in different areas of the same screen 1000 based on a type. Through this, a user may identify the plurality of alerts by type in a common interface through a user terminal connected to a system. According to an example embodiment, an internal user and an external user may identify alerts related to the respective users in the same screen area of the system in real time. For example, a seller and an internal user related to the same logistics contract may identify information on an order, a contract, and signing up on a home screen of a logistics system in real time. Through this, the seller and the internal user may easily identify whether the contract is progressing and perform fast progress.

Referring to FIG. 10, a news alert output area 1010 may correspond to a type that requires an immediate check of a user. Since the immediate check is required from the user, the news alert output area 1010 may be located in an upper portion of the screen 1000. Also, a required alert corresponding to a type that requires a feedback from a user may have a higher priority than that of a notice alert in terms of importance although the required alert does not require the immediate check than the news alert. Thus, a required alert output area 1020 may be located below the news alert output area 1010 and above a notice alert output area 1030. Accordingly, the notice alert output area 1030 may be located at a lower end of the required alert output area 1020. Also, a plurality of alerts may be output by grouping.

As an example, in a logistics system, when a seller registers a product, and when data verification and registration of the registered product are completed, an internal user may request an order in general. Also, an alert that requests the order may be sent to the seller through an e-mail. The seller may check details of an order request through the e-mail and send stock of the product to a fulfillment center at a predetermined date and time. In the fulfillment center, the stock of the product may be stowed in a loading place, and tests may be conducted on some products to verify whether the products are defective. When it is confirmed that the product is not defective, the internal user may determine whether the product is actually sold.

Regarding this, according to an example embodiment of the present disclosure, an order request alert created through a previously provided API may be provided to a terminal of the seller, so that the order request alert is displayed on a home screen of each system. In this instance, the same order request alert may be output to the internal user. Such order request alert may be an informative alert for providing notification that the data verification and registration on a seller's registered product are completed, and may be displayed in the notice alert output area 1030. The seller may identify detailed content of the order request through the order request alert displayed on the home screen. Likewise, the internal user may also identify the order request through the home screen.

As another example, in a contract system, an internal user may generally discuss with a seller and then send a contract for product advertisement or product registration. The seller may access a contract system, enter a menu for contract management, confirm the contract through a refresh, and complete signing. Thereafter, the internal user may access the contract system, enter a logistics management menu, confirm the signed contract through the refresh, and complete the contract.

Regarding this, according to an example embodiment of the present disclosure, the contract may be provided to a terminal of the seller through a previously provided API, so that a contract signing request alert is displayed on a home screen of a system. The contract signing request alert may be an alert that requires a feedback from a user and may be displayed in the required alert output area 1020. Through this, the seller may confirm the contract on a first screen of the system without a need to enter a separate menu for contract management and sign the contract in accordance with the alert. Also, an alert for notifying that the seller has signed the contract may be provided at the time of the signing, so that the internal user recognizes that the seller signs the contract in real time.

As still another example, in a logistics system, the seller may generally request for subscription to the logistics system along with documents required for registration. The internal user may confirm a new subscription request or additional document submission request through a subscription-related menu. The internal user may send an e-mail to request the seller to submit additional documents. When the seller checks the e-mail, the seller may access the logistics system again to submit the additional document. As such, a subscription procedure may be performed.

According to an example embodiment of the present disclosure, instead of performing the subscription procedure through the e-mail, the seller's subscription request, additional document submission, and progress check may be checked in an area related to an alert on the home screen. Such alerts may be identified simultaneously by the seller and the internal user through a common interface. For example, an alert that requests for a user's subscription request and additional document submission may be a required alert and identified in the required alert output area 1020. Also, an alert provided according to the progress of the subscription procedure may be a notice alert and identified in the notice alert output area 1030.

Figure 11:
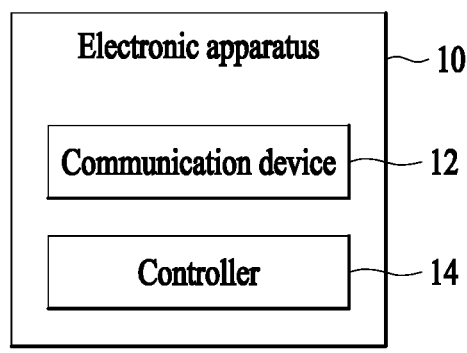
FIG. 11 is a block diagram illustrating an electronic apparatus according to an example embodiment of the present disclosure.

FIG. 11 is a block diagram illustrating the electronic apparatus 10 according to an example embodiment of the present disclosure.

The electronic apparatus 10 of the present disclosure may include a communication device 12 and a controller 14. The components illustrated in FIG. 11 are not essential to implement an electronic apparatus, and thus, it will be apparent to those skilled in the art that more or fewer components may be employed.

The communication device 12 may communicate with an external electronic apparatus using wired or wireless communication technology. The external electronic apparatus may be a terminal or a server. Also, the communication device 12 may use communication technologies such as global system for mobile communication (GSM), code division multi access (CDMA), long term evolution (LTE), 5G, wireless LAN (WLAN), Wi-Fi, Bluetooth™, radio frequency identification (RFID), IrDA communication, ZigBee, and NFC, for example.

The communication device 12 may transmit and receive data to and from the user terminal 20. Specifically, the communication device 12 may provide a menu management tool to the user terminal 20 and receive an input through the menu management tool. Also, the communication device 12 may provide information on an item of a menu to the user terminal 20. The communication device 12 may receive or provide a plurality of alerts.

The controller 14 may control an overall operation of the electronic apparatus 10 and process data and a signal. The controller 14 may transmit and receive data to and from the user terminal 20 through the communication device 12. The controller 14 may set an item of a menu and an authority to access the item based on a received user input. The controller 14 may use the communication device 12 to receive at least one change input for the item of the menu and the authority to access the item. In this case, the controller 14 may reset information on the item of the menu or the authority based on the change input.

The controller 14 may classify and group the plurality of alerts. The controller 14 may verify whether the plurality of alerts is processed or process the alerts as terminated alerts. Also, the controller 14 may verify whether a user input for an alert is present so that an additional alert requesting the alert to be processed is provided. The controller 14 may generate statistics information on the plurality of alerts.

Figure 12:
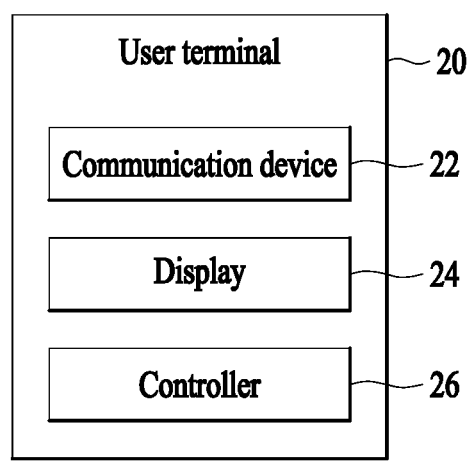
FIG. 12 is a block diagram illustrating a user terminal according to an example embodiment of the present disclosure.

FIG. 12 is a block diagram illustrating the user terminal 20 according to an example embodiment of the present disclosure.

The user terminal 20 of the present disclosure may include a communication device 22, a display 24, and a controller 26. The components illustrated in FIG. 12 are not essential to implement a terminal, and thus, it will be apparent to those skilled in the art that more or fewer components may be employed.

The communication device 22 may communicate with an external electronic apparatus using wired or wireless communication technology. The external electronic apparatus may be a terminal or a server. The communication device 22 may receive a menu management tool from the electronic apparatus 10 and provide a user input therefor. Also, the communication device 22 may receive information on an item of a menu for which an authority is set. The communication device 22 may provide or receive a plurality of alerts, and provide user inputs for the alerts to the electronic apparatus 10.

The display 24 may provide an output interface between the user terminal 20 and a user. The display 24 may display a menu screen. Also, the display 24 may display the plurality of alerts in different screen areas based on a type.

The controller 26 may control overall operations of the user terminal 20 and process data and signals. The controller 26 may transmit and receive data to and from the electronic apparatus 10 through the communication device 22. Also, when a user input for a system logo is present, the controller 26 may switch a menu screen to a screen corresponding to an item related to an alert.

Meanwhile, although not illustrated in FIG. 12, the user terminal 20 may further include an input device. The input device may include a camera or an image input part for inputting an image signal, a microphone or an audio input part for inputting an audio signal, and a user input part (for example, a touch key, a push key (a mechanical key) and the like). In addition, the input device may include one or more sensors configured to sense at least one of internal information of a mobile terminal, information on or regarding an environment in the surroundings of the mobile terminal, and user information. For example, the input device may include at least one of a proximity sensor, an illumination sensor, a touch sensor, a motion sensor, a finger scan sensor, an optical sensor (for example, a camera), a microphone, and the like. Meanwhile, the user terminal 20 of the present disclosure may utilize information obtained from at least two or more of these sensors. The input device may receive a user input for a system logo or receive user inputs for a plurality of alerts.

The apparatus described herein may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A method of managing a system, the method comprising:
   providing a menu management tool for managing a menu of a system;
   setting, for each of a plurality of systems, an item of the menu and an authority to access the item based on an input received through the menu management tool;
   uploading, to a storage device in data communication with a network, code information associated with the item of the menu and the authority;
   providing information including a link referring to the code information to a plurality of terminals through the network; and
   responsive to a terminal of the plurality of terminals accessing at least one of the plurality of systems, instructing the terminal to output a system screen based on the code information accessible via the link.

2. The method of claim 1, wherein the instructing of the terminal to output the system screen comprises:
   responsive to the terminal accessing a first system of the at least one of the plurality of systems, providing information associated with an item of the first system to the terminal based on the code information,
   wherein authority for the terminal to access the item of the menu has been set.

3. The method of claim 1, further comprising:
   receiving at least one change input associated with at least one of the item of the menu or the authority via the menu management tool;
   resetting information associated with the at least one of the item of the menu or the authority based on the at least one change input;
   modifying the code information based on the resetting of the information to generate modified code information; and
   responsive to the terminal accessing at least one of the plurality of systems and accessing the modified code information via the link, instructing the terminal to output an updated system screen.

4. The method of claim 3, wherein the at least one change input is related to a modification of the authority to an allowance, a modification of the authority to a denial of authority, or a deactivation of the authority.

5. The method of claim 1, wherein the setting of the item of the menu and the authority comprises:
   receiving an input for selecting a type of each of the plurality of systems; and
   setting each of an item of an upper end menu and an item of a lower end menu based on the type of each of the plurality of systems,
   wherein the item of the upper end menu and the item of the lower end menu vary based on the type of each of the plurality of systems.

6. The method of claim 1, wherein the authority varies based on at least one of whether the terminal is a terminal of an internal user of the at least one of the plurality of systems or whether the terminal is a terminal of a user related to logistics.

7. The method of claim 1, further comprising:
   receiving, from the plurality of systems, a plurality of alerts related to a user and having a common form;
   providing the plurality of alerts to the terminal; and
   verifying whether the plurality of alerts are processed,
   wherein the plurality of alerts have a common form associated with the plurality of systems.

8. The method of claim 7, wherein the providing of the plurality of alerts comprises:
   classifying the plurality of alerts for each type of alert to generate a classified plurality of alerts; and
   providing the classified plurality of alerts based on each type of alert.

9. The method of claim 8, wherein the type of alert includes at least one of a type of alert requiring an immediate check from a user, a type of alert requiring feedback from the user, or a type of alert not requiring a check or feedback from the user, wherein information associated with a duration for which an alert is provided to the user for each type of alert is preset.

10. The method of claim 8, wherein the providing of the classified plurality of alerts based on each type of alert comprises:
    providing alerts classified as a same type of alert for a predetermined period of time based on grouping the alerts classified as the same type of alert based on attributes of the alerts classified as the same type of alert and systems by which the alerts classified as the same type of alert are provided.

11. The method of claim 7, further comprising:
generating statistics information associated with the plurality of alerts; and
providing the statistics information to the plurality of systems, wherein the statistics information includes information associated with a proportion of terminated alerts of the plurality of alerts, wherein the information associated with the proportion of the terminated alerts is based on information associated with a proportion of alerts processed as terminated alerts based on a duration elapsed and a proportion of alerts processed by the user.

12. The method of claim 11, wherein the statistics information includes information associated with a ratio of a number of alerts output on the plurality of terminals compared to a number of alerts provided on the plurality of terminals, for each of the plurality of terminals.

13. An apparatus for system management, the apparatus comprising:
a communication device; and
a controller,
wherein the controller is configured to:
provide a menu management tool for managing a menu of a system through the communication device;
set, for each of a plurality of systems, an item of the menu and an authority to access the item based on an input received through the menu management tool;
upload, to a storage device in data communication with a network, code information associated with the item of the menu and the authority;
provide information including a link referring to the code information to a plurality of terminals through the network; and
responsive to a terminal of the plurality of terminals accessing at least one of the plurality of systems, instruct the terminal to output a system screen based on the code information accessible via the link.

14. A terminal comprising:
a communication device;
a display;
an input device; and
a controller,
wherein the controller is configured to:
receive information including a link referring to code information from a system managing apparatus through the communication device, wherein the code information includes information regarding an item of a menu for which an authority to access for the terminal for each of a plurality of systems is set;
when the terminal accesses a first system, refer to the code information through the link, wherein the first system is included in the plurality of systems, and the terminal is a terminal for which an authority to access the item included in the first system is set; and
output a menu screen through the display based on information regarding the item of the menu included in the code information.

15. The terminal of claim 14, wherein the controller is configured to:
when the terminal accesses the first system, refer to the code information in real time through the link; and
when the code information is modified based on at least one change input regarding the item of the menu and the authority to access the item, output a menu screen through the display based on information regarding the item of the menu for which the authority to access for the terminal included in the modified code information is set.

16. The terminal of claim 15, wherein the change input is related to a modification of the authority to access the item into an allowance or denial authority to or an input for authority deactivation.

17. The terminal of claim 14, wherein the controller is configured to:
receive a plurality of alerts classified for each type through the communication device; and
output the classified plurality of alerts in different areas for each type through the display.

18. The terminal of claim 17, wherein the type includes at least one of a type that requires an immediate check from a user, a type that requires a feedback from the user, or a type that does not require a check or a feedback from the user.

* * * * *